Patented Mar. 26, 1929.

1,706,484

UNITED STATES PATENT OFFICE.

ERICH FISCHER AND CARL ERICH MÜLLER, OF HOCHST-ON-THE-MAIN, GERMANY, ASSIGNORS TO GRASSELLI DYESTUFF CORPORATION, OF NEW YORK, N. Y., A CORPORATION OF DELAWARE.

AZO DYESTUFF AND PROCESS OF PREPARING SAME.

No Drawing. Application filed April 21, 1927, Serial No. 185,652, and in Germany May 3, 1926.

Our present invention relates to the manufacture of a new azo dyestuff; more particularly, to the manufacture of the azo dyestuff of the following probable formula:

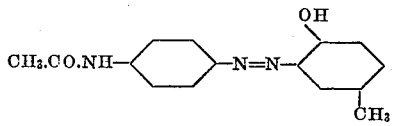

Our new azo dyestuff is obtainable by combining the diazo compound of para-aminoacetanilide with para-cresol. It forms in the dry state a yellow powder and dyes cellulose esters bright and intense yellow shades.

The following example serves to illustrate our invention, but it is not intended to limit it thereto; the parts are by weight:

(1.) 108 parts of para-cresol are dissolved in 114 parts of caustic soda solution. Into this solution, to which an excess of sodium carbonate solution has been added, is introduced drop by drop a diazo solution obtained in known manner from 150 parts of para-aminoacetanilide. The dyestuff is worked up in the usual manner and forms, after being dried, a yellow powder dyeing cellulose esters bright and intense yellow shades and having the following formula:

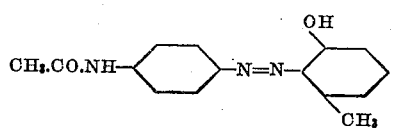

We claim:

1. The process of preparing a yellow azo dyestuff by combining a diazzo compound of para-aminoacetanilide with para-cresol.

2. As a new product, the compound of the following formula:

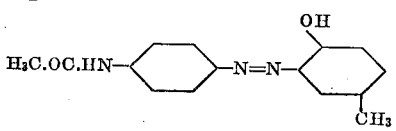

being in dry state a yellow powder and dyeing cellulose esters bright and intense yellow shades.

3. Materials dyed with the dyestuff defined in claim 2.

In testimony whereof, we affix our signatures.

ERICH FISCHER.
CARL ERICH MÜLLER.